US006811202B2

(12) United States Patent
Hornady

(10) Patent No.: US 6,811,202 B2
(45) Date of Patent: Nov. 2, 2004

(54) APPARATUS FOR COVERING PAYLOADS

(76) Inventor: B. C. Hornady, P.O. Box 846, Monroeville, AL (US) 36460

( * ) Notice: Subject to any disclaimer, the term of this patent is extended or adjusted under 35 U.S.C. 154(b) by 0 days.

(21) Appl. No.: 09/833,847

(22) Filed: Apr. 12, 2001

(65) Prior Publication Data
US 2002/0149225 A1 Oct. 17, 2002

(51) Int. Cl.$^7$ .................................................. B60P 7/04
(52) U.S. Cl. .............................. 296/100.01; 276/100.11; 242/919; 212/328
(58) Field of Search ....................... 276/100.01, 100.11, 276/100.12, 100.13, 100.17, 100.18; 242/919; 414/399, 392; 212/166, 71, 328, 285; 182/3

(56) References Cited

U.S. PATENT DOCUMENTS

| 709,641 | A | * | 9/1902 | Mann ............................ 212/71 |
| 1,409,702 | A | * | 3/1922 | Gill ................................ 182/3 |
| 3,784,028 | A | * | 1/1974 | Stewart ....................... 212/285 |
| 3,820,840 | A | | 6/1974 | Forsberg |
| 3,863,782 | A | | 2/1975 | Sandrock |
| 3,917,088 | A | * | 11/1975 | Visser ......................... 212/285 |
| 4,032,186 | A | | 6/1977 | Pickering et al. |
| 4,067,603 | A | | 1/1978 | Fenton |
| 4,089,424 | A | * | 5/1978 | Steimann et al. ........... 212/166 |
| 4,094,047 | A | * | 6/1978 | Carlsson .................... 24/241 R |
| 4,113,112 | A | * | 9/1978 | Ray ............................. 212/71 |
| 4,172,685 | A | * | 10/1979 | Nabeshima et al. |
| 4,650,392 | A | * | 3/1987 | Casteel |
| 4,919,283 | A | * | 4/1990 | Riley et al. ................. 212/285 |
| 4,927,317 | A | * | 5/1990 | Acosta ........................ 212/259 |
| 4,944,551 | A | | 7/1990 | Hardy, Jr. |
| 5,002,152 | A | * | 3/1991 | Lebow ............................ 182/3 |
| 5,028,198 | A | | 7/1991 | Buhr |
| 5,102,182 | A | | 4/1992 | Haddad, Jr. |
| 5,224,427 | A | * | 7/1993 | Riches et al. .................. 182/3 |
| 5,338,084 | A | * | 8/1994 | Wardell ................. 296/100.12 |
| 5,621,926 | A | * | 4/1997 | La Madeleine ................ 4/498 |
| 5,713,712 | A | | 2/1998 | McIntyre |
| 5,769,586 | A | | 6/1998 | Schulte |
| 5,882,062 | A | | 3/1999 | Chenowith |
| 5,979,599 | A | * | 11/1999 | Noles ............................. 182/3 |
| 6,148,580 | A | * | 11/2000 | Weir .............................. 182/3 |
| 6,273,401 | B1 | * | 8/2001 | Payne ......................... 254/266 |
| 6,502,709 | B1 | * | 1/2003 | Parker ........................ 212/328 |
| 2001/0032435 | A1 | * | 10/2001 | Austin ........................... 182/3 |
| 2002/0043816 | A1 | * | 4/2002 | Johnston ...................... 296/98 |
| 2002/0046902 | A1 | * | 4/2002 | Choate .......................... 182/3 |

FOREIGN PATENT DOCUMENTS

| GB | 2109758 | * | 6/1983 |
| JP | 7-144573 | * | 6/1995 |
| NL | 1005509 | * | 9/1998 |

OTHER PUBLICATIONS

Load Protection: A Case Study In Ergonomics And Safety, Green et al., 1997.*

* cited by examiner

Primary Examiner—D. Glenn Dayoan
Assistant Examiner—H. Gutman
(74) Attorney, Agent, or Firm—Bradley Arant Rose & White LLP; John W. Smith, T; Nathan W. Johnson

(57) ABSTRACT

An apparatus for covering objects, particularly payloads being shipped on flat bed trailers. The apparatus has a slidable hoist connected to a track suspended over a payload. The hoist has a retractable line which is connected to a spreader bar that can be connected to a covering that will be lifted and spread over the payload as the hoist is maneuvered by a remote controlled system along the track. The apparatus also has a rod that traverses beneath and near one end of the track. The rod provides support to the trailing portion of the covering as it is pulled over the payload by the hoist.

13 Claims, 4 Drawing Sheets

APPARATUS FOR COVERING PAYLOADS

BACKGROUND

The shipping industry is vital to commerce in the United States and in most nations around the world. The trucking industry is one of the most important branches of the shipping industry in many countries including the United States. It is estimated that at least thirty to forty percent of all goods transported in the United States are hauled by trucks pulling flat bed trailers.

The types of materials and commodities hauled on flat bed trailers vary dramatically. Many such materials can be hauled without regard to whether such goods are exposed to inclement weather. However, it is often preferable that materials that are shipped on flat bed trailers and other modes of open transportation be protected from adverse weather conditions by a covering of some type. There are various types of coverings used in the shipping industry. One of the most common is a tarpaulin which is usually made of durable but flexible material such as vinyl or canvas. Tarpaulins can conform to many shaped and sized payloads being shipped.

However, spreading a tarpaulin over a payload on a flat bed trailer presents several problems. Manual application of a tarpaulin often begins with lifting a folded tarpaulin to the top of the payload. Workers then climb to the top of the payload, unfold the tarpaulin and spread it over the payload. Because tarpaulins are usually heavy, some workers cannot lift or maneuver tarpaulins without assistance. It is further difficult for workers to obtain complete coverage over uneven payloads by manually applying a tarpaulin, especially if they attempt to do so without assistance. The process is therefore time-consuming and inefficient. In some instances, workers injure themselves by lifting and moving the tarpaulin, which often weigh up to 200 pounds.

In addition, working on top of a payload often exposes workers to dangerous heights. It is well known that workers have been injured as a result of falling while climbing up or down the payload or while trying to maneuver the tarpaulin on top of the payload. It is estimated that injuries to workers while covering payloads is a significant source of worker's compensation claims and other losses in the shipping industry. There is, as a result, a need for a safe, efficient means to cover payloads that are to be shipped.

There are presently several devices employed by those in the trucking industry for covering payloads. These include: Forsberg, U.S. Pat. No. 3,820,840; Chenowth, U.S. Pat. No. 5,882,062; Fenton, U.S. Pat. No. 4,067,603; Hardy, U.S. Pat. No. 4,944,551; Haddad, U.S. Pat. No. 5,102,182; Pickering, U.S. Pat. No. 4,032,186; and McIntyre, U.S. Pat. No. 5,713,712. However, each one of these references suffers from disadvantages, including that each requires sides or some other upright supports mounted on the trailer bed for applying and supporting a covering.

For the foregoing reasons, there is a need for an apparatus that permits the application of a covering over a payload that can be operated by a single individual from ground level without requiring that the device be mounted on or attached to the vehicle or payload being covered. It is further an object of the present invention that it be easy to erect, mobile, and adaptable to various shapes and sizes of payloads.

SUMMARY

These and other objects and advantages are obtained in an apparatus for covering payloads being shipped by various modes of transportation, including flat bed trailers. The apparatus comprises a movable hoist, having a retractable line, that is slidably engaged to a suspended track such that said hoist can move longitudinally over a payload positioned underneath. The apparatus further comprises a spreader bar that is attached to the retractable line of said hoist. The spreader bar has means for attaching to the leading edge of a tarpaulin or other cover that will be spread over the payload as will be described in more detail below. The apparatus is further comprised of a rod affixed in transverse fashion beneath and near one end of the track. It will be appreciated that the rod provides support to the trailing portion of the tarpaulin as the leading edge of the tarpaulin is pulled by the hoist over the payload. The hoist is powered by remote means, that can be controlled from ground level at most any position adjacent to the payload.

DESCRIPTION OF THE DRAWINGS

These and other features, aspects and advantages of the present invention will become better understood with reference to the following description, appended claims, and accompanying drawings where:

DESCRIPTION

Figure 1:
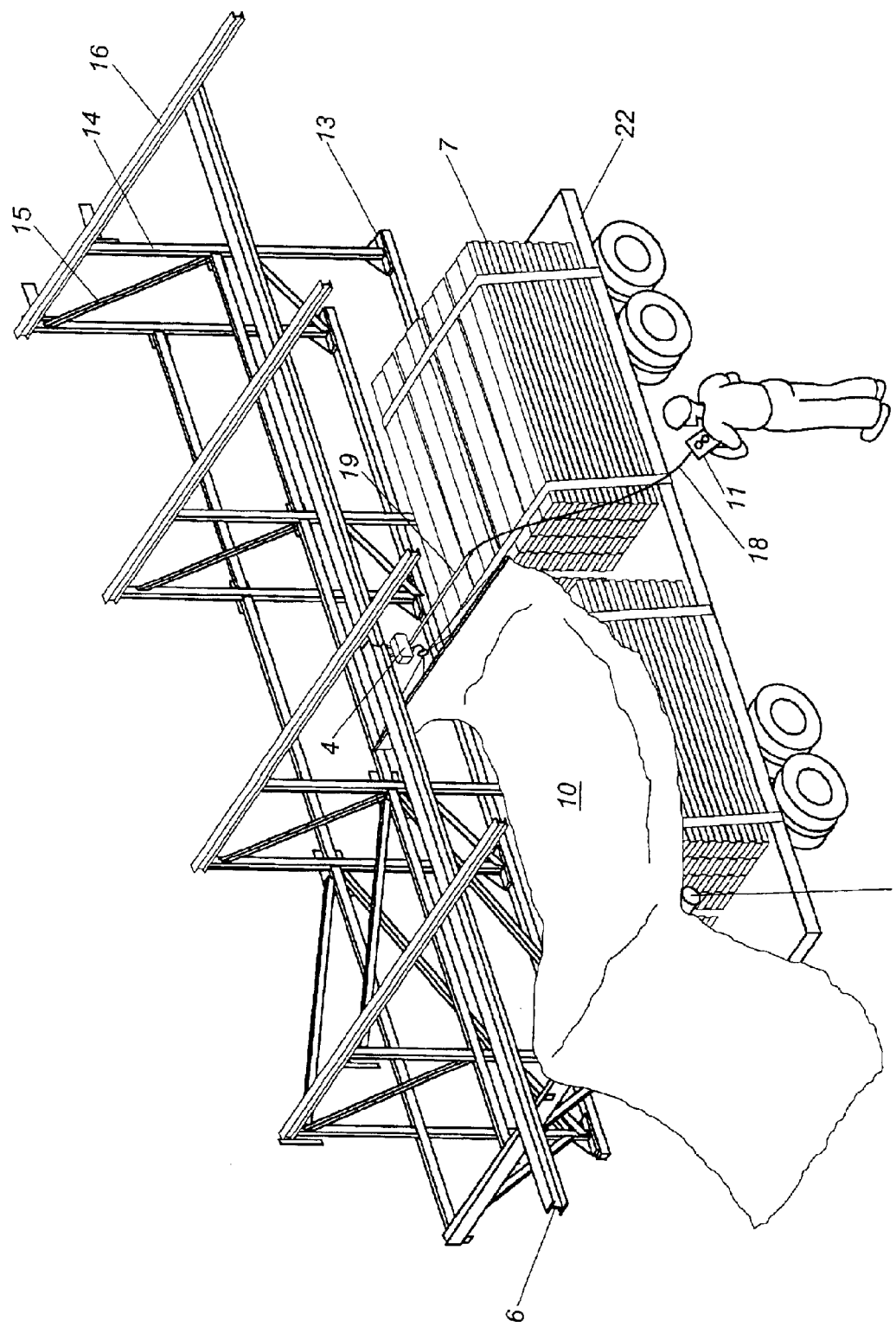
FIG. 1 is a three-dimensional view of an embodiment of the invention.
Figure 2:
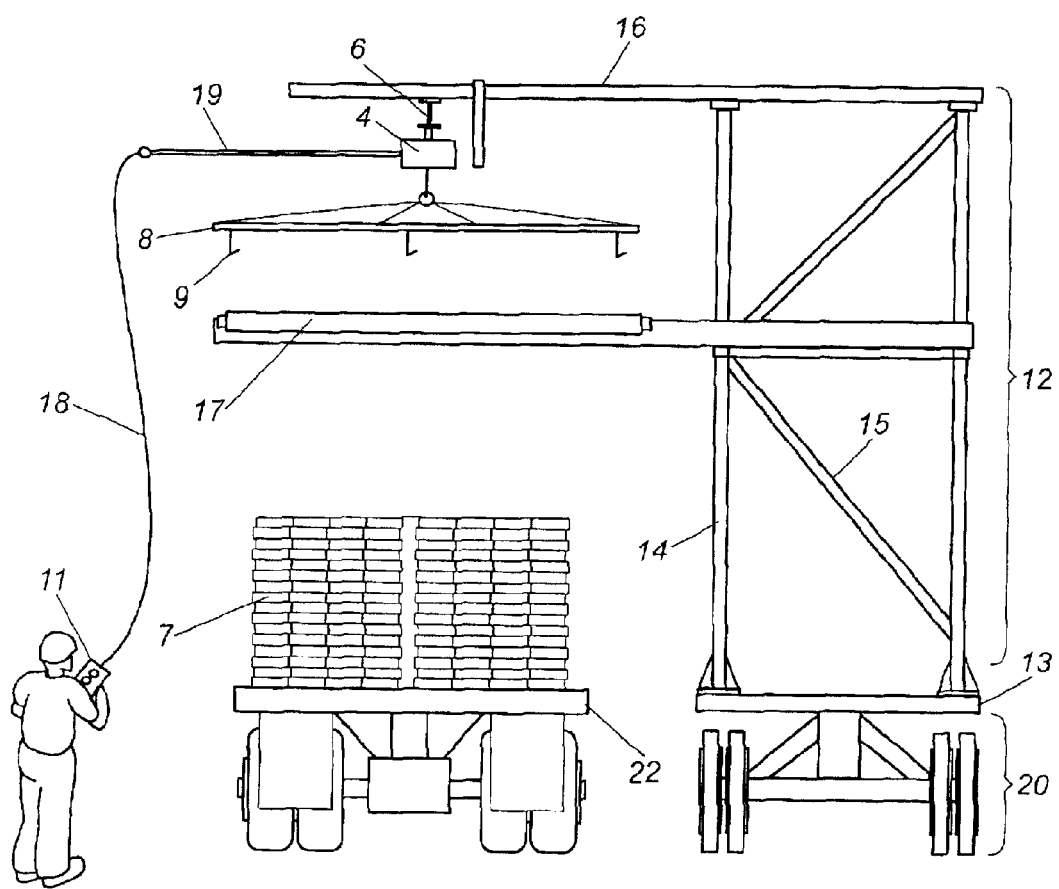
FIG. 2 is a partial three-dimensional view of the present invention in use on a flat-bed trailer.
Figure 3:
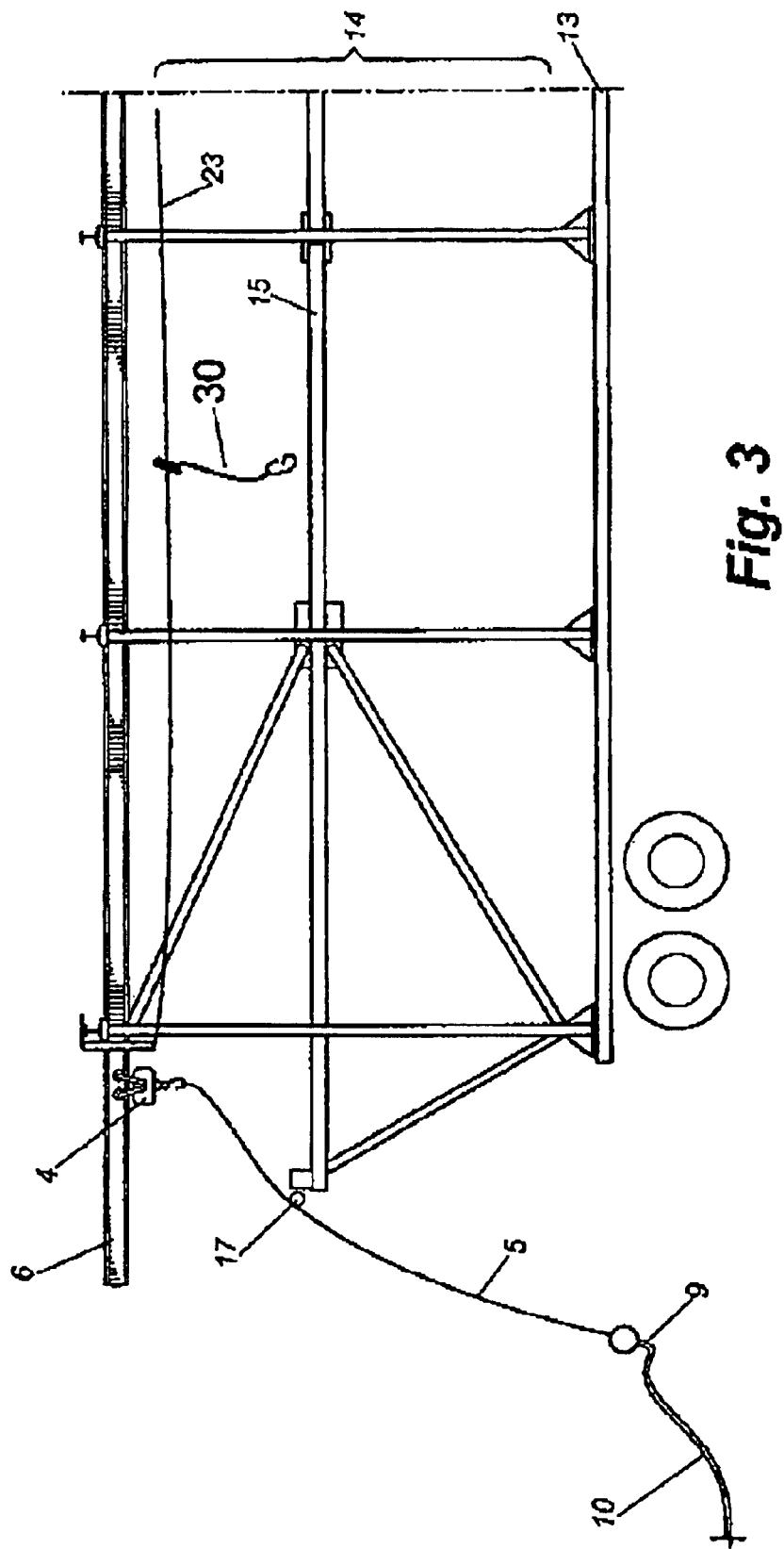
FIG. 3 is a partial side view of the apparatus.
Figure 4:
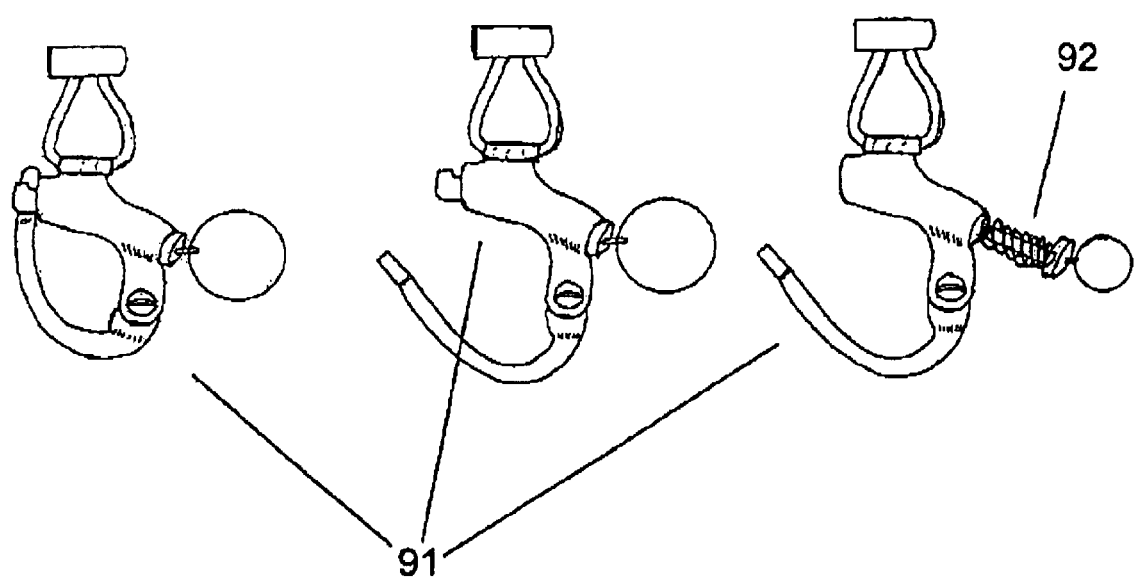
FIG. 4 is a close-up view of attachment of snap shackles and other spring loaded locking mechanisms on the spreader bar.

Referring to FIGS. 1, 2 and 3, the apparatus for covering payloads is illustrated. Although the field of application of the present invention includes providing coverings over objects being shipped by various modes of transportation, it is anticipated that the present invention will find its most widespread use in connection with covering payloads being shipped on flat bed trailers.

The apparatus comprises a movable hoist 4, having a retractable line 5, that is slidably engaged to a suspended track 6. It will be appreciated that said track permits said hoist to move longitudinally over a payload 7 positioned underneath. The apparatus further comprises a spreader bar 8 that is attachable to said retractable line of said hoist. The spreader bar has means 9 for attaching to the leading edge of a tarpaulin 10 or other cover that will be spread over payload 7 as will be described in more detail below. In a preferred embodiment, means 9 comprises what are commonly referred to in the industry as snap shackles 91, or other similar devices, that contain spring loaded locking mechanisms 92 that permit release by remote measures such as by pulling a rope properly attached to said shackle. The hoist 4 is powered by a means 11 operable from various positions, including from the ground level.

In a preferred embodiment, said track is suspended from a support structure 12. In one alternative embodiment, said support structure comprises a base 13 and a vertically extending side frame 14 rigidly attached thereto, said side frame being generally rectangular in shape and comprised of a plurality of sturdy members 15 such as steel beams connected together by welding or other fastening means. At least two arms 16, fixedly attached near the top portion of and at opposing ends of said side frame, extend perpendicularly from said frame in parallel fashion. Said track 6 is fixedly attached to said arms such that said track spans between said arms. Said track 6 should be attached to said arms a sufficient distance away from said side frame such that it could be suspended generally over the vertical centerline of payload 7 parked adjacent and parallel to said base 13.

It will be appreciated that to be most effective, said support structure should be of sufficient height to permit suspension of said track over variable sized payloads being shipped, including payloads of the maximum height permitted by the Department of Transportation for the shipment of payloads on a standard flat bed trailer, which is currently 13 feet, 6 inches. In one alternative embodiment of the invention, said support structure is mobile. This can be achieved by mounting said base 13 to a standard flat bed trailer 20, thus permitting the entire apparatus to be transported and positioned at will.

The preferred embodiment of the apparatus further comprises a rod 17 that traverses beneath track 6 on which hoist 4 moves. In the preferred embodiment, said rod is rigidly attached to said support structure at a point that is below and near one end of said track 6. It will be appreciated that rod 17 should be located at a point sufficiently high to permit clearance over most any payload. In the preferred embodiment, said rod has a circular cross section and is rotatable about its axis. As will be understood upon reference to FIG. 1, the rod supports the trailing portion of tarpaulin 10 thereby enabling the tarpaulin to be more evenly spread over payload 7 and reducing the likelihood that tarpaulin 10 will become entangled with or ensnared on the payload.

The present invention further comprises a means for moving said hoist along said track. In the preferred embodiment, said means comprises a power source and a remote control unit 11 connected thereto that is operable from ground level at any point adjacent to the payload. In one alternative embodiment, said remote control unit is connected to said hoist by wire 18. Said hoist has at least one lateral guide 19 of sufficient length to extend beyond the vertical plane defined by the outer sides of a payload. Said wire 18 runs from said hoist along and over the tip of said guide 19, and then descends and is connected to said remote control unit 11. It will be appreciated that this particular configuration causes the remote control unit to move in concert with said movable hoist 4 as it moves over payload 7. This obtains the desirable result of allowing the operator to move at ground level along with the leading edge of tarpaulin 10 as it is spread over payload 7.

In operation, flat bed trailer 22 with payload 7 is positioned adjacent and generally parallel to base 13 of the support structure 12 so that the centerline of payload 7 is aligned generally beneath track 6. Using remote control unit 11, the hoist 4 is maneuvered along track 6 to a point behind the rear of payload 7 and behind rod 17. Using remote control unit 11, retractable line 5, which is connect to spreader bar 8, is lowered to the ground. Spreader bar 8 then is attached by connecting means 9 to the leading edge of tarpaulin 10 that has been positioned on the ground behind the payload. Using remote control means 11, retractable line 5 is reeled in thereby raising spreader bar 8 to a level above rod 17. The hoist 4 is next powered along the track 6 pulling the tarpaulin 10 attached to spreader bar 8. As hoist 4 pulls the leading edge of the tarpaulin 10 over payload 7, rod 17 supports the trailing portion of tarpaulin 10 thus providing clearance for tarpaulin 10 over payload 7. Upon reaching the front end of the payload, the hoist is stopped and the spreader bar 8 lowered, thus draping tarpaulin 10 over payload 7. Connecting means 9 are then released from tarpaulin 10. Spreader bar 8 can then be raised to permit the payload to be transported away from the apparatus.

It will be appreciated that, even using the present invention, it might become necessary for the operator to climb and work on top of the payload. For instance, the operator might wish to ensure a smooth and secure spreading of the covering over the payload. This can sometimes occur when two tarpaulins are applied to obtain complete coverage over a payload of great length. The convergence of the two tarpaulins on top of the payload might sometimes require manual smoothing or securement. To provide safety to those individuals who choose to work on top of the payload in such instances, one alternative embodiment of the present invention further comprises tether line 23 suspended in general parallel fashion to track 6. Upon ascending flat bed trailer 22, an operator secures himself by connecting a safety cable 30 that is secured on one end to a harness worn by the operator and is slidably engaged on the other end to said tether line 23. It will be appreciated that by connecting himself to the tether line 23, an operator has substantial freedom to move around on top of the payload and is protected from falling should he trip or lose his balance.

Although the present invention has been described in considerable detail with reference to certain preferred embodiments thereof, other versions are possible. For example, the present invention can be adapted for use on various types and sizes of flat bed trailers and other vehicles used to transport payloads, such as trains and barges. It is further envisioned that other types of structures and means can be utilized for mounting and suspending track 6. The present invention is easy to use and install and is relatively simple to manufacture. Having described the basic concept of the present invention, it will be understood by those skilled in the art that the foregoing detailed disclosure is intended to be presented by way of example only, and is not limiting. Various alternations, improvements and changes will occur and are in the scope of the present invention. Accordingly, the present invention is limited only by the following claims and equivalents thereto. The spirit and scope of the appended claims should not be limited to the description of the preferred embodiments contained herein.

What is claimed is:

1. An apparatus for covering a payload of a vehicle with a flexible payload cover, said apparatus comprising:
   (a) a suspended track;
   (b) a hoist, slidably engaged to said track, said hoist having a retractable line, said retractable line being maneuverable in multiple directions;
   (c) a spreader bar attachable to said retractable line, said bar having means for attaching to the payload cover;
   (d) means to move said hoist; and
   (e) a rod attached to a support for the track and positioned at a height greater than the height of the payload, wherein the rod is supported independently of the vehicle and is positioned above the height of the vehicle and adapted to freely rotate in a manner whereby the rod rotatably supports a trailing edge of the payload cover that is draped over the rod.

2. The apparatus of claim 1, wherein said support further comprises:
   (a) a base, which base comprises a flatbed trailer, and
   (b) a vertically extending side frame rigidly attached thereto; and
   (c) rigid arms extending in perpendicular fashion from generally the same height of said side frame, said track spanning between said arms.

3. The apparatus of claim 2, wherein said track is suspended a sufficient distance away from said side frame such that the track is suspended generally over an expected vertical centerline of a payload positioned beneath.

4. The apparatus of claim 2, wherein said arms are extended from said support structure at a sufficient height to overhang variable sized payloads positioned beneath.

5. The apparatus of claim 2 further comprising:
   (a) means for a person to be secured to said apparatus to protect against falling from the payload being covered by said apparatus.

6. Apparatus of claim 5 wherein said means for a person to be secured comprise:
   (a) a tether line suspended from said support structure in generally parallel fashion to said track; and
   (b) a safety cable slidably engaged at one end to said tether line.

7. The apparatus of claim 1, wherein said means to move said hoist comprises an electronically operable remote controlled system.

8. The apparatus of claim 1, wherein said means to move said hoist comprises:
   (a) a guide extending laterally from said hoist; and
   (b) a wire connected at one end to said hoist, running along said guide, and connected at the second end to an electronically operable remote controlled system.

9. The apparatus of claim 1, wherein said means for attaching to a covering comprises spring loaded locking mechanisms.

10. The apparatus of claim 1, wherein said means for attaching to a covering comprises a plurality of snap shackles.

11. The apparatus of claim 1, wherein the rod is vertically positioned between a highest point on the vehicle and a lowest point on the track.

12. An apparatus for covering payloads, said apparatus comprising
   (a) a movable hoist slidably suspended over a payload, said hoist having a retractable line that is maneuverable in multiple directions and that can be connected to a covering to be spread over the payload; and
   (b) a rod positioned below said hoist and above an expected height of said payload, wherein said rod is rotatable about a substantially horizontal axis and is positioned to support in a freely rotatable manner at least a portion of the covering may pass as the covering is draped over the rod and drawn over the payload.

13. A method of covering a payload of a vehicle, comprising:
   a. attaching the covering to a hoist;
   b. raising a leading edge of the covering to a height higher than a rod that is freely rotatable about a substantially horizontal axis and is higher than a highest point on the vehicle;
   c. moving the leading edge over and beyond the rod in the direction of the payload, whereby the covering passes at least partially over the rod;
   d. lowering the leading edge; and
   e. detaching the leading edge.

* * * * *